United States Patent [19]
Tognazzini

[11] Patent Number: 6,006,021
[45] Date of Patent: Dec. 21, 1999

[54] DEVICE FOR MAPPING DWELLINGS AND OTHER STRUCTURES IN 3D

[75] Inventor: Bruce Tognazzini, Woodside, Calif.

[73] Assignee: Sun Microsystems, Inc., Palo Alto, Calif.

[21] Appl. No.: 08/674,492

[22] Filed: Jul. 1, 1996

[51] Int. Cl.[6] .................... G01S 13/08; G01S 13/89; G06F 17/50
[52] U.S. Cl. ........................ 395/500.01; 342/179
[58] Field of Search ..................... 342/357, 179, 342/195; 364/512, 560; 395/500, 125; 324/357, 642; 250/253; 33/293; 701/213, 96

[56] References Cited

U.S. PATENT DOCUMENTS

| | | | |
|---|---|---|---|
| 4,972,591 | 11/1990 | Hammet | 33/293 |
| 5,025,150 | 6/1991 | Oldham et al. | 250/253 |
| 5,091,869 | 2/1992 | Ingram et al. | 364/560 |
| 5,471,218 | 11/1995 | Talbot et al. | 342/347 |
| 5,495,576 | 2/1996 | Ritchey | 395/125 |
| 5,512,834 | 4/1996 | McEwan | 324/642 |
| 5,515,057 | 5/1996 | Lennen et al. | 342/357 |
| 5,589,833 | 12/1996 | Randall et al. | 342/195 |
| 5,614,913 | 3/1997 | Nichols et al. | 342/357 |
| 5,644,318 | 7/1997 | Janky et al. | 342/357 |
| 5,652,717 | 7/1997 | Miller et al. | 364/578 |
| 5,668,555 | 9/1997 | Starr | 342/179 |
| 5,673,050 | 9/1997 | Moussally et al. | 342/22 |
| 5,704,142 | 1/1998 | Stump | 37/348 |
| 5,734,348 | 3/1998 | Aoki et al. | 342/357 |
| 5,739,785 | 4/1998 | Allison et al. | 342/357 |
| 5,796,363 | 8/1998 | Mast | 342/22 |

OTHER PUBLICATIONS

O'Brien et al., "Accuracy validation of the IFSARE Radar System", 1994 IEEE, pp. 234–238, Apr. 1994.

Kuc, "A spatial Sampling Criterion for Sonar Obstacle Detection", 1990 IEEE, pp. 686–690, Aug. 1990.

*Primary Examiner*—Kevin J. Teska
*Assistant Examiner*—Lonnie A. Knox
*Attorney, Agent, or Firm*—McDermott, Will & Emery

[57] ABSTRACT

A micropower impulse radar is used to take measurements, such as those needed to establish room size and the dimensions and location of objects within the walls of a room. A computer controls the scanning of the radar and the collection of datapoints. A global positioning satellite (GPS) unit locates the precise portion of the radar and another unit loads a fixed referenced location to which all measurements from different rooms are baselined. By collecting points and referencing them to a common point or wireframe representation of a building can be developed from which "as built" architectural plans can be produced.

34 Claims, 8 Drawing Sheets

Figure 4

Conversion of Spherical Coordinates to Cartesian Coordinates

400 → Given the following:

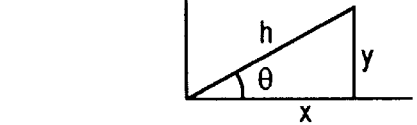

then sin(θ) = y/h
cos(θ) = x/h

So, the spherical coordinates (r, θ, ω) where
  r = radius
  θ = azimuth
  ω = elevation
are converted in a two step process to derive (x,y,z)

410 → Step #1 (solve for z)

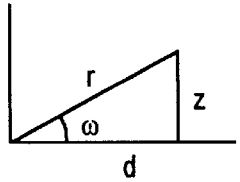

where d is the distance from the origin to the projection of z on the x,y plane then  sin (ω) = z/r,   z = sin (ω) · r
   cos (ω) = d/r,   d = cos (ω) · r 420 → Step #2 (solve for x & y)

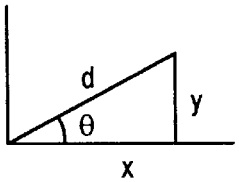

sin (θ) = y/d,   y = sin (θ) · d
cos (θ) = d/r,   x = cos(θ) · d

DEVICE FOR MAPPING DWELLINGS AND OTHER STRUCTURES IN 3D

BACKGROUND OF THE INVENTION

1. Field of the Invention

The invention relates to computer controlled scanning radar systems, and more particularly, to those utilized for mapping a building or other structure in three dimensions in order to capture "as built" information.

2. Description of Related Art

Once a house, building or other structure has been constructed, the plans, architectural blueprints and engineering specifications are put into storage at some location. This location may be unknown to the building's owners. Even if the location of these documents is known, they may be difficult to retrieve or they may have been destroyed. Additionally these documents may contain significant deviations from the building "as built".

If the original documents are available, but are not in a digital format, or are in a format no longer supported by existing software systems, the architect or engineer is faced with a labor and time intensive effort to enter the data manually. An architect, engineer, builder or owner would certainly prefer to avoid a costly and error-prone data entry process and generate, directly from the building, a three dimensional model of the structure as it currently exists.

Radar systems, such as micropower impulse radar (MIR), are known that rapidly emit radio pulses (approximately one million per second) that are extremely short (less than a billionth of a second in duration) and that are in a frequency range substantially lower than convention radars. Low frequency pulses are better able to penetrate solid objects. Additionally, MIR radars are extremely selective in their range gating capabilities. It is possible to examine and record only those echoes that could have been generated by an object within a certain range from the radar unit and ignore all others. Due to the high pulse rate and low frequency, echoes from many objects that are lined up in a row may be received, thus allowing the radar to "see behind" objects, detecting other objects that would otherwise be visually hidden.

Global positioning satellite (GPS) systems are known that provide the location of a global positioning receiver by sophisticated triangulation algorithms using data provided by orbiting satellites with a high degree of accuracy. Accuracy, to millimeter tolerances may be obtained by using differential GPS.

Effective means for the digital transmission of data via radio by multiple transmitters operating on a single frequency are known. Various techniques are employed to prevent transmissions from different computing devices using the same frequency from preventing communications. Carrier Sense Multiple Access with Collision Detection (CSMA/CD) is widely employed in both wireless radio applications and in wired computer networks.

Radar devices that will detect, for example, a stud behind a sheet rock wall, are known. These devices do not provide any transmission or storage of the location of the hidden object.

Computer Aided Design (CAD) computer software packages are known that accept as input the coordinates that describe a three-dimensional structure and then generate drawings of that structure.

The Problems

A principal problem solved by this invention is that of capturing "as built" information about buildings or other structures. It also provides a quick and easy way of surveying the internals of walls and the content of rooms and of automatically generating a computer representation of the building.

SUMMARY OF THE INVENTION

The present system provides apparatus, systems, processes and computer program products which allow the creation of digital three dimensional wire-frame models of complete buildings or portions of buildings. These models can then be manipulated using CAD software and printed as blueprints that reflect the actual status of a structure.

In operation, one GPS receiver is placed in a fixed and known location (e.g. a corner of the building to be scanned) and a second GPS receiver is attached to a portable MIR radar unit and placed in a room to be mapped. Both GPSs send their location information to a computing device that then determines the position of the second GPS relative to the first. This, with the correction of small offset values between the second (movable) GPS and the radar unit, provides highly accurate relative position values.

A computer instructs the radar unit to begin a scan of the room. The radar unit transmits each echoed return to the computer which then converts the spherical coordinates provided by the radar unit into Cartesian coordinates centered on the scanning radar. These coordinates are then corrected for the relative offsets computed earlier to provide the Cartesian coordinates of the object being scanned, using the fixed GPS unit as a global point of reference.

After completing a scan of the room, the radar unit with its attached GPS is moved to another room and the process is repeated.

The resulting data set of coordinate information stored in the computer is then used as input to CAD software to generate a three dimensional wire-frame model of all the rooms that were scanned.

The invention relates to apparatus for accurately measuring distance including a portable radar for measuring distances from the radar to one or more surfaces, a first global positioning satellite receiver, located a fixed measured distance from the radar, and a computer connected to receive information from the radar and from the portable global positioning satellite receiver and configured to calculate a distance from the radar to a surface. The scanning radar is controlled by the computer. All points whose distances have been determined are referenced to a common location determined by a global positioning satellite receiver. The points can then be organized into a three dimensional wireframe representing the room or building being scanned.

The invention also relates to a method of accurately measuring distance by placing a portable radar and a first global positioning satellite receiver, located a fixed measured distance from the radar, in one or more rooms, linking a computer to receive information from the radar and from the global positioning satellite receiver, and using the information to calculate a distance from the radar to a surface point. A plurality of points measured in this way are referenced to a common point at a locations determined by a global positioning satellite receiver, and are used to construct a wireframe of the rooms where the points were measured. Measurements from points measured in different rooms are used to construct at least a partial wireframe of the building in which the points were measured.

The inventions are also directed to a method of creating architectural drawings reflecting construction of a building, by surveying a plurality of points in one or more rooms of a building using a scanning radar referenced to a global positioning satellite receiver, using the location of the points to create a three dimensional wireframe of the building, and converting the three dimensional wireframe into architectural drawings using computer assisted design software.

The invention is also directed to a method of determining the location of objects within the wall of a building, by placing a portable radar and a first global positioning satellite receiver, located a known distance from the radar, in a room, linking a computer to receive information from the radar and from the global positioning satellite receiver, and using the information to calculate a distance from the radar to a surface point interior to a wall of the room.

The invention is also directed to a system for accurately measuring distance including a central computer, and a plurality of scanning units, connected to the central computer and each comprising a portable radar for measuring distances from the radar to one or more surfaces, a first global positioning satellite receiver, located a fixed measured distance from the radar, and a computer connected to receive information from the radar and from the portable global positioning satellite receiver and configured to calculate a distance from the radar to a surface and to send the distance to the central computer.

The invention is also directed to computer program products for carrying out the techniques of the invention.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The object, features and advantages of the system of the present invention will be apparent from the following description, in which:

FIG. 4 illustrates the conversion of spherical coordinates to Cartesian coordinates.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
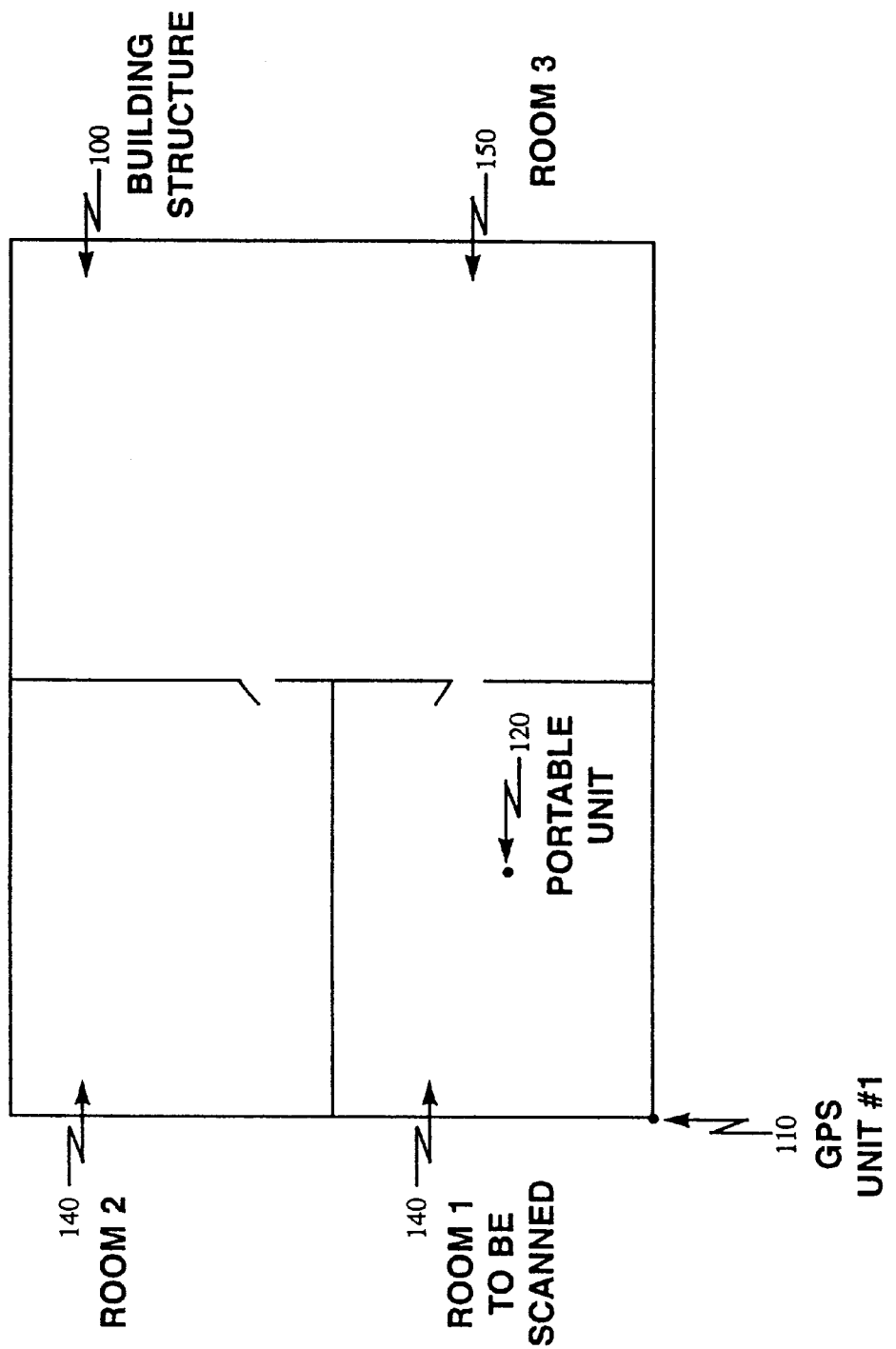
FIG. 1 illustrates exemplary relative placement of the components of the system when taking measurements.

FIG. 1 illustrates exemplary relative placement of the components of the system. The building (100) contains a number of rooms to be scanned. A reference fixed GPS device is located at the south-west corner of the building (110). The first room to be scanned is room 130 and the MIR device, computing device and movable GPS device are all located at 120 within the room. After the scan of the first room (130), the scanning unit is moved to the subsequent rooms to be scanned (140 and 150). Alternatively, a plurality of scanning units may be operative simultaneously, each feeding results to a central computer of processing of data points into a wireframe.

Figure 2:
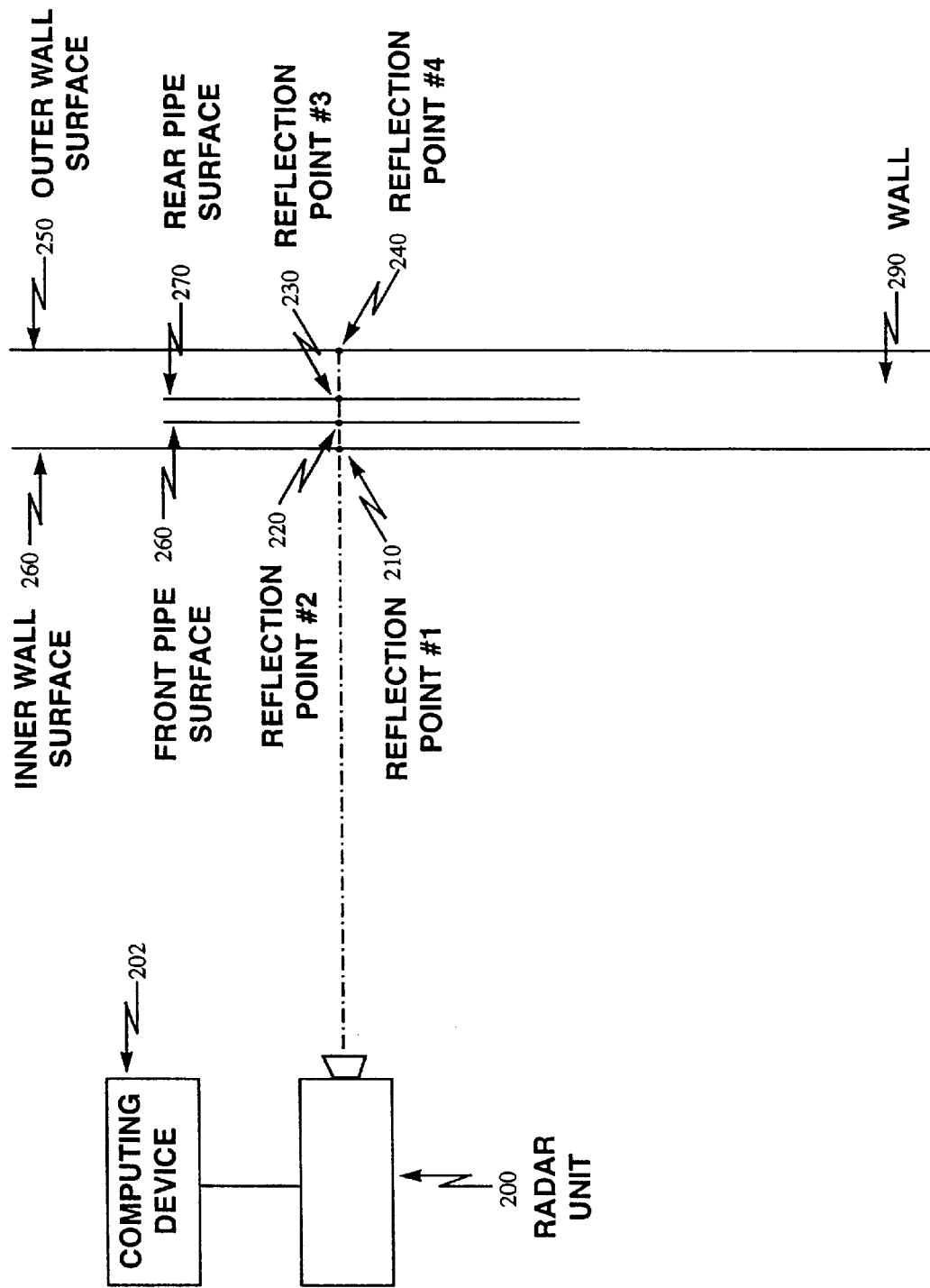
FIG. 2 illustrates the penetrating nature of the MIR pulses.

FIG. 2 illustrates the penetrating nature of the MIR pulses. The MIR device (200) sends a pulse towards the wall (290). The first echo reflects at the transition boundary of the inner surface of the wall 260 and is received by the MIR. The azimuth and elevation are known to the MIR and the round trip delay between sending a radar pulse and its return permits one to determine the radius. Thus the location of the point 210 is known in spherical coordinates. The coordinates are then transmitted to the computing device (202). A pipe, contained within the wall provides 2 reflection points: the "front" of the pipe (280) and the "rear" of the pipe (270). The actual reflection points are indicated by (220 and 230). Finally, the pulse returns an echo from the outer wall surface (250) at the reflection point (240). As each set of coordinates is transmitted to the computer they are converted into Cartesian coordinates relative to the fixed GPS device, and a three-dimensional wire-frame model is successively built with more and more detail.

Figure 3A:
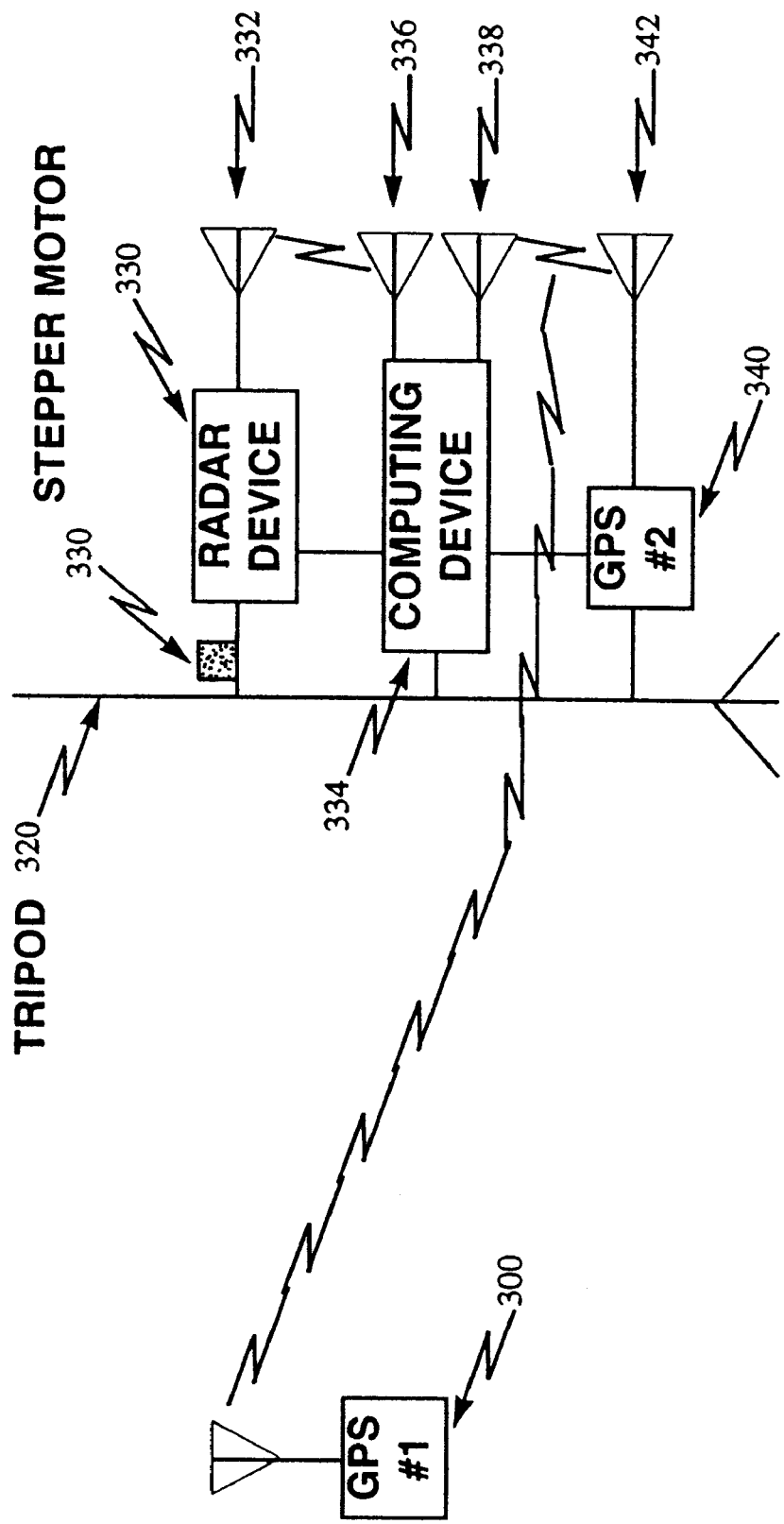
FIG. 3A illustrates a portable assembly for taking measurements in a room.

In FIG. 3A, the fixed GPS device (300) transmits (310) its location information to the computing device (334). A tripod (320) holds the MIR device (330), stepper or servo motor (321), the second GPS device (340) and the computing device (334). The tripod devices may be connected to each other using a hardwired connection or they may be linked over a radio or 1R wireless link.

Figure 3B:
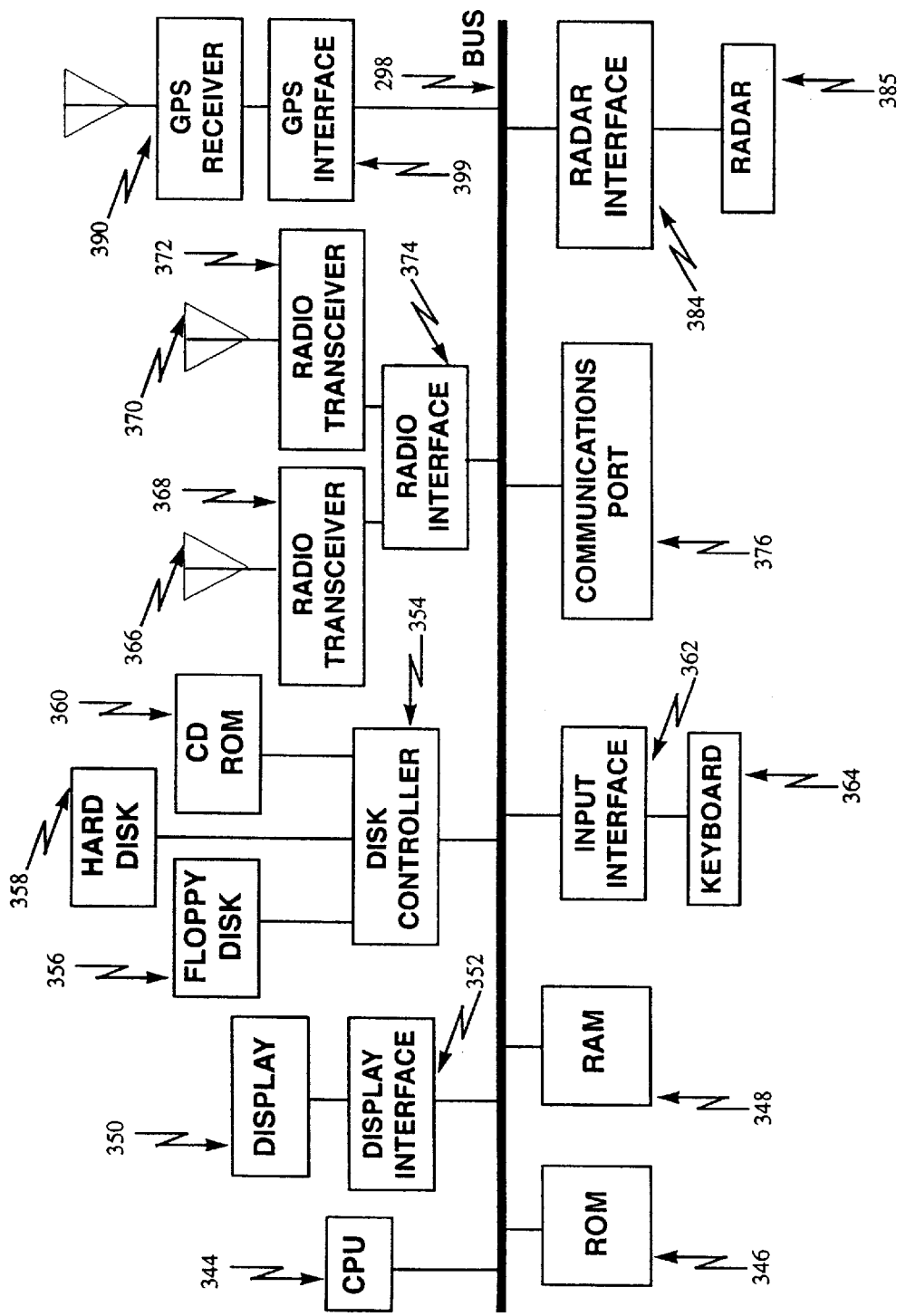
FIG. 3B is a block diagram of the portable assembly of FIG. 3A.

FIG. 3B is a block diagram of the portable assembly of FIG. 3A. A BUS (378) serves as the universal connector for all the components. The microprocessor (344) controls each component using programming and data to be found in memory components RAM (346) and ROM (348). An input interface (362) is provided to allow the operation of a keyboard (364). A disk drive controller (354) controls a CD ROM (360), a hard disk drive (358) and a floppy disk drive (358). A communication port is provided at (376). A transceiver for GPS data (368) and its antenna (366) along with an transceiver for MIR data (372) and its antenna (370) are connected to a radio interface (374). The display interface (352) controls the display (350).

The computer device 334 controls the radius, azimuth and elevation of the radar scan, driving the stepper or servo motors to ensure complete coverage of the room at a desired resolution. The computer device may be connected to the radar device 385 over a hardwired interface 384 or over a radio or infrared (1R) link. Similarly, the computer device can receive GPS information from the receiver GPS2 (390) via interface 389 or over a wireless link.

Figure 3C:
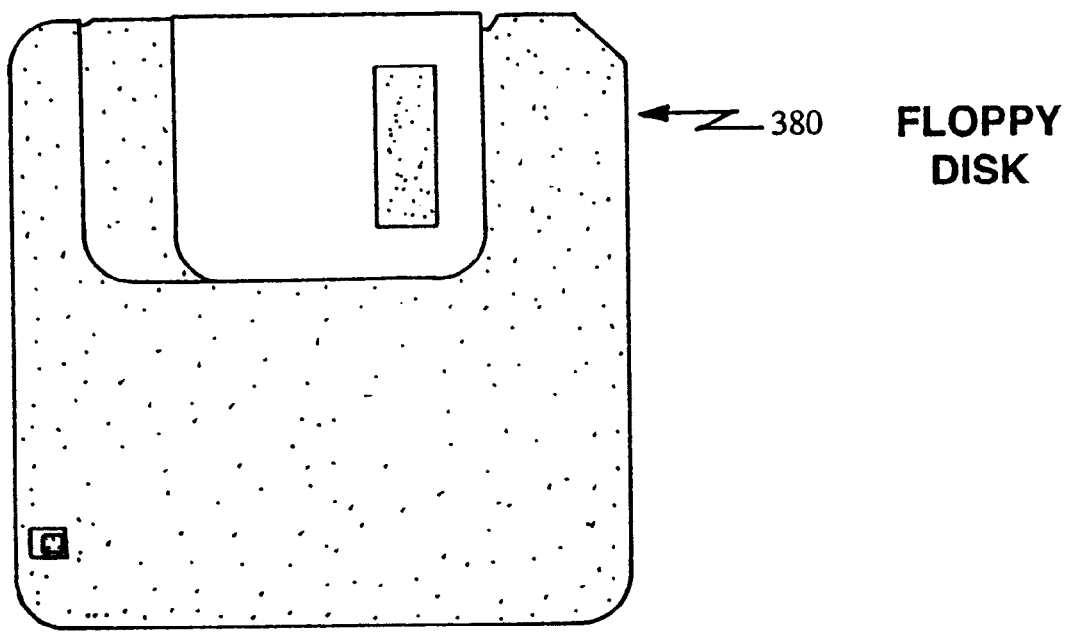
FIG. 3C is an illustration of exemplary memory medium used for carrying computer programs and data for carrying out the invention.

FIG. 3C illustrated as a floppy disk (380) represents the types of storage media that typically contains data and programming information useful with the invention.

FIG. 4 illustrates the conversion of spherical coordinates to Cartesian coordinates. The basic mathematical formulas employed are shown within (400). The sine of the angle between the hypotenuse and either leg of a right triangle provides the ratio of the other leg to the hypotenuse. The cosine of the same angle provides the ratio of the selected leg to the hypotenuse. Thus, knowing the angle and the length of the hypotenuse, the length of each leg may be calculated.

Component (410) demonstrates the first step required to map the coordinates from the spherical system to the Cartesian system. Given a right triangle with hypotenuse r (the range component from the spherical coordinates) and the angle psi, which is the elevation of the object described by the spherical coordinates, the corresponding z component of the Cartesian coordinates is given as: $z=\sin(psi)^* r$. Additionally, the computation of d, which represents the distance from the origin to the projection of z on the x,y plane is given by: $d=\cos(psi)^* r$.

Having determined z and d, the same transformation is applied using the azimuth (theta) to determine the x and y components. Given a right triangle with hypotenuse d (the distance from the origin to the projection of z on the x,y plane) and the angle theta, which is the azimuth of the object described by the spherical coordinates, the corresponding y component of the Cartesian coordinates is given as: $y=\sin(theta)^* d$. Additionally, the computation of x is given by: $z=\cos(theta)^* d$.

The result of the above computations are the x, y and z coordinates of an object initially describe by r, theta and psi spherical coordinates.

Figure 5:
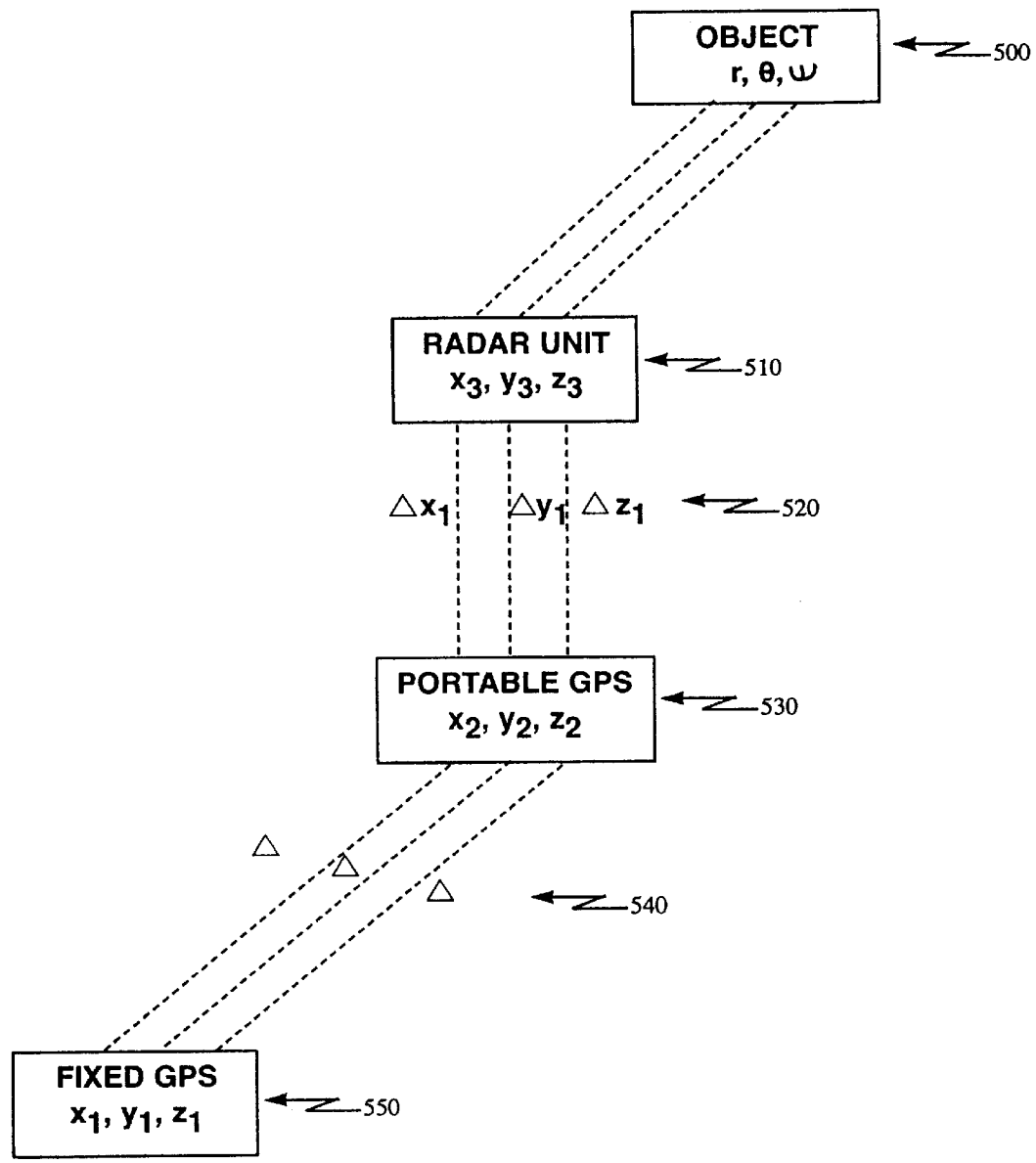
FIG. 5 illustrates the computations necessary to map the coordinates of the object scanned to the fixed GPS device.

FIG. 5 illustrates the computations necessary to map the coordinates of the object scanned to the fixed GPS device.

As shown in FIG. 4, the transformation from spherical coordinates to Cartesian coordinates may be easily accomplished. This provides the coordinates of the scanned object relative to the MIR device. In order to map these coordinates into the coordinate space defined by the fixed GPS device the following steps are required.

The coordinates of the scanned object (500) relative to the MIR are denoted x3 y3 z3 (510). The offset to the local GPS is delta x1, delta y1 and delta z1. Adding these deltas to the coordinates at (510) yields the coordinates of the object (500) relative to the local GPS, denoted as x2 y2 z2 (530). The offsets from the local GPS (530) to the fixed GPS (550) are calculated by the computing device based upon the location information each GPS transmits to it. The resulting deltas, delta x2, delta y2, delta z2 are added to the x2 y2 z2 coordinates from (530) and result in the coordinates x1 y1 z1 which represent the position of the object relative to the fixed GPS.

Figure 6:
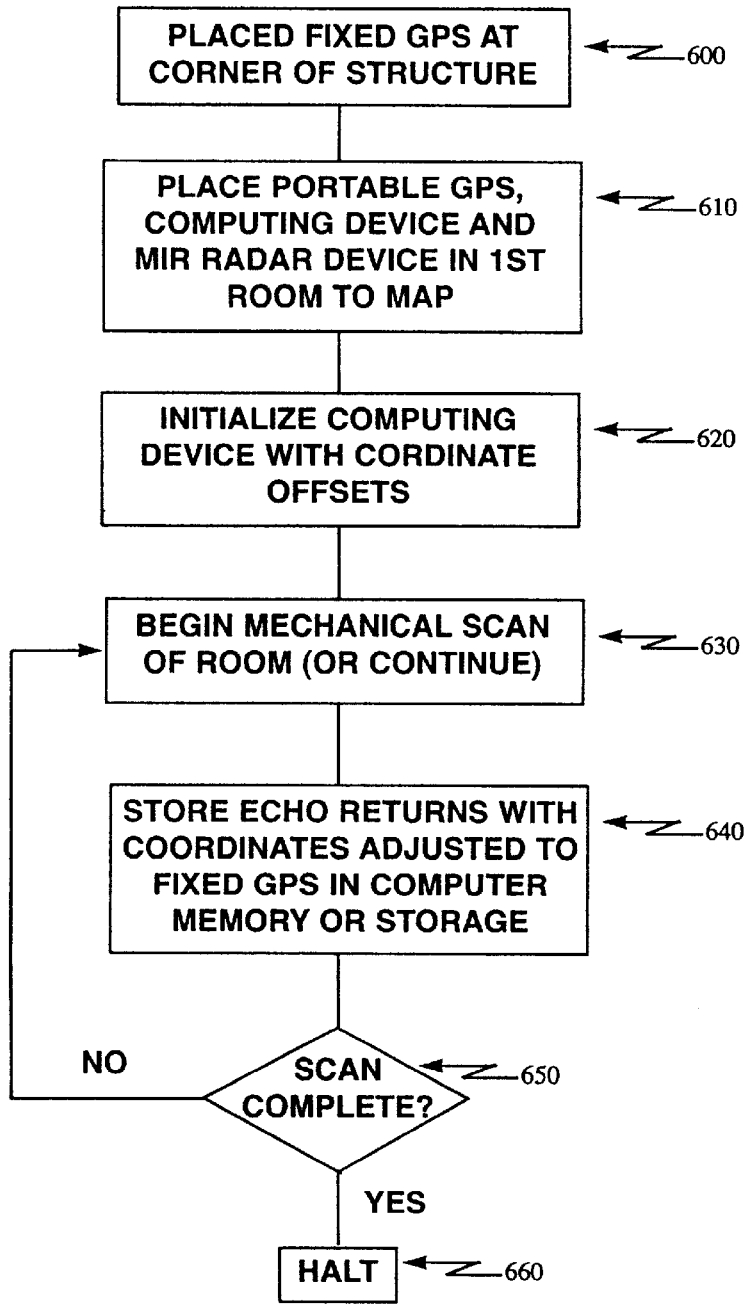
FIG. 6 is a flow chart of the process of scanning a room.

FIG. 6 is a flow chart of the process of scanning a room. The fixed GPS device is placed in a suitable position, normally a corner of the structure (600). The portable GPS device, MIR device and the computing device are placed in the room to be mapped (610). The computing device is initialized with the relative offsets between the two GPS devices and the offset between the MIR device and the portable GPS device prior to beginning the scan so that coordinate conversion can be performed (620). The scan of the room begins or continues at (630). The computing device receives the spherical coordinates of the object being scanned from the MIR device, converts them as described in FIGS. 4 and 5 and stores them in memory or on an internal storage device (640). If the scan in not completed (650) then the process begins again at (630), otherwise the scan is complete and the process is terminated (660).

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. Apparatus for accurately measuring distance comprising:
   a. a portable radar for measuring distances and directions from the radar to one or more surfaces within a structure;
   b. a portable first global positioning satellite receiver, located a fixed measured distance from said radar; and
   c. a computer connected to receive information from said radar and from said portable global positioning satellite receiver and configured to calculate a distance from said radar to a surface of said one or more surfaces within a structure using said information and said fixed measured distance.

2. Apparatus of claim 1, in which said portable radar is a scanning radar, the scanning of which is controlled by said computer.

3. Apparatus of claim 2, further comprising:
   a second global positioning satellite receiver located a distance from said first global positioning satellite receiver and said computer is connected to receive information from said second global positioning satellite receiver.

4. Apparatus of claim 3, in which said computer calculates said distance using the location of said second global positioning satellite receiver as a reference.

5. Apparatus of claim 4, in which said computer causes said scanning radar to scan a room and to determine a plurality of distances to points in or near the room and in which said computer constructs a wireframe representation of said room referenced to the location of said second global positioning satellite receiver.

6. The apparatus of claim 3, wherein the second global positioning satellite receiver is located a second fixed measured distance from a fixed point on a building.

7. The apparatus of claim 1, wherein said portable radar is a micropower impulse radar.

8. A method of accurately measuring distance comprising the steps of:
   a. placing a portable radar and portable first global positioning satellite receiver, located a fixed measured distance from said radar, in a room, the radar configured to measure distances to a surface of the room;
   b. linking a computer to receive information from said radar and from said global positioning satellite receiver; and
   c. using said information and said fixed measured distance to calculate a distance from said radar to a surface point on said surface.

9. The method of claim 8, further comprising the step:
   d. repeating steps a–c for a plurality of points.

10. The method of claim 9, further comprising moving said portable radar and said first global positioning satellite receiver, to a different room and repeating steps a–d.

11. The method of claim 10, further comprising the step of:
   referencing distances to a plurality of points measured in different rooms to the location of a second global positioning satellite receiver located in or near a building in which said rooms are located.

12. The method of claim 11, in which said plurality of points measured in different rooms are used to construct a wireframe of the rooms where the points were measured.

13. The method of claim 11, in which said plurality of points measured in different rooms are used to construct at least a partial wireframe of the building in which said points were measured.

14. The method of claim 11, wherein the second global positioning satellite receiver is located a second fixed measured distance from a fixed point on the building.

15. The method of claim 8, in which said calculated distance is in Cartesian coordinates converted from spherical coordinates.

16. The method of claim 8, wherein said portable radar is a micropower impulse radar.

17. A method of creating architectural drawings reflecting construction of a building, comprising the steps of:
   a. surveying a plurality of points in one or more rooms of a building using a scanning radar referenced to a global positioning satellite receiver;
   b. using the location of said points to create a three dimensional wireframe of said building;
   c. converting said three dimensional wireframe into architectural drawings using computer assisted design software.

18. The method of claim 17, wherein said scanning radar is a micropower impulse radar.

19. The method of claim 17, wherein said global positioning satellite receiver is referenced to a second global positioning satellite receiver located a fixed measured distance from a fixed point on the building.

20. A method of determining the location of objects within the wall of a building, comprising the steps of:
   a. placing a portable radar and a portable first global positioning satellite receiver, located a known distance from said radar, in a room, said radar configured for measuring distances to a surface;
   b. linking a computer to receive information from said radar and from said global positioning satellite receiver; and
   c. using said information and said known distance to calculate a distance from said radar to a surface point interior to a wall of said room.

21. The method of claim 20, wherein said portable radar is a micropower impulse radar.

22. The system of claim 20, wherein said portable is a micropower impulse radar.

23. The method of claim 20, further comprising:
   aa. placing a second global positioning satellite receiver located a second known distance from a fixed point on the building, before step c, using said information; and
   bb. linking the computer to receive information from said second global positioning satellite receiver, before step c, using said information.

24. A system for accurately measuring distance comprising:
   a. a central computer; and
   b. a plurality of scanning units, connected to said central computer and each comprising
       b1. a portable radar for measuring distances from the radar to one or more surfaces of a building;
       b2. a portable first global positioning satellite receiver, located a fixed measured distance from said radar; and
       b3. a computer connected to receive information from said radar and from said portable global positioning satellite receivers and configured to calculate a distance from said radar to at least one surface of said surfaces using said information and said fixed measured distance and to send said calculated distance to said central computer.

25. The system of claim 24, in which said central computer organizes said distances into a three dimensional wireframe of said building.

26. The system of claim 24, in which said distances include points within a wall of said building.

27. The system of claim 24, further comprising:
   c. a second global positioning satellite receiver located a second fixed measured distance from a fixed point on said building,
   wherein said computer is configured to receive information from said second global positioning satellite receiver.

28. A computer program product comprising:
   a. a memory medium; and
   b. a computer program stored on said memory medium, said computer program containing instructions for controlling a scanning radar to scan a plurality of points in or near a room to determine distances to said points.

29. The computer program product of claim 28 in which said computer program further contains instructions for referencing all distances to the location of a global positioning satellite receiver.

30. The computer program product of claim 28, wherein said scanning radar is a micropower impulse radar.

31. A computer program product comprising:
   a. a memory medium; and
   b. a computer program stored on said memory medium, said computer program containing instructions for directing surveying of a plurality of points on one or more surfaces in one or more rooms of a building using a scanning radar referenced to a global positioning satellite receiver, and using the locations of said scanned points to create a three dimensional wireframe of said building.

32. The computer program product of claims 31, in which said computer program further contains instructions for converting said three dimensional wireframe into architectural drawings using computer assisted design software.

33. The computer program product of claim 31, wherein said scanning radar is a micropower impulse radar.

34. The computer program product of claim 31, wherein said program further contains instructions for using information from a second global positioning satellite receiver located a measured distance from a fixed point on said building.

* * * * *

UNITED STATES PATENT AND TRADEMARK OFFICE
CERTIFICATE OF CORRECTION

PATENT NO. : 6,006,021

DATED : December 21, 1999

INVENTOR(S) : Bruce Tognazzini

It is certified that error appears in the above-identified patent and that said Letters Patent is hereby corrected as shown below:

Column 5, line 62, change "z" to --x--.

Signed and Sealed this

Sixth Day of June, 2000

*Attest:*

Q. TODD DICKINSON

*Attesting Officer*  *Director of Patents and Trademarks*